May 24, 1960  G. WERNER  2,938,067
WATER-AND PRESSURE-RESISTANT LEAD-IN FOR
COAXIAL SUBMARINE COMMUNICATION CABLE
Filed Nov. 28, 1956  3 Sheets-Sheet 1

Inventor:
Georg Werner.

Inventor:
Georg Werner

United States Patent Office 2,938,067
Patented May 24, 1960

2,938,067

WATER- AND PRESSURE-RESISTANT LEAD-IN FOR COAXIAL SUBMARINE COMMUNICATION CABLE

Georg Werner, Berlin-Charlottenburg, Germany, assignor to Siemens & Halske Aktiengesellschaft, Berlin and Munich, Germany, a corporation of Germany Filed Nov. 28, 1956, Ser. No. 624,842

Claims priority, application Germany Nov. 30, 1955

8 Claims. (Cl. 174—70)

The present invention is concerned with connecting a coaxial submarine communication cable, particularly one provided with thermoplastic insulation, to a pressure-resistant container or junction box containing repeaters, Pupin coils or other structural or switching members, by means of a lead-in comprising a glass seal which is resistant to lengthwise pressure.

A glass seal for this purpose is described in U.S. Patent No. 2,676,197. In accordance with this patent, a metal cup, which has a thin outer wall and into which a thin-walled tube surrounding the inner cable conductor is inserted, is filled with glass. The inner, thin-walled tube is soldered at its end to the conductor in sealing engagement therewith. While the structure is adapted to provide a satisfactory seal for the conductor lead-in, difficulties are experienced in incorporating the seal. The known structure also contemplates making the metal cup for the glass seal integral with the end cap of the box but the resulting shapes are rather complicated. The glass seal arranged in the inlet to the housing of the junction box is in this known embodiment separated from the polyethylene cable insulation, by a separate chamber which is filled with a composition and by polyamide insulators arranged on the inner conductor and a conductor covering of rubber. The glass seal and the cable insulation thus form independent parts of the cable lead-in. The known structure also requires a conically shaped insulating plug serving as a seal between the glass seal and the inside of the housing of the junction box.

In accordance with the present invention, the glass seal is arranged within the cable lead-in opening of the housing and the thermoplastic cable insulation is forced in heated condition against the glass seal, preferably under pressure in such a manner that air can escape, so that hollow spaces are avoided between the insulation and the glass seal, thus providing a tight and intimate seal between these parts.

In order to make the cable insulation watertight in longitudinal direction, within the region of the lead-in into the housing, and to connect the cable with the housing in such a manner that it is resistant to traction and slippage, a metal sheathing or tubing of copper or the like which surrounds the cable insulation at the end of the cable is in well known manner firmly rolled onto the cable insulation at intervals or continuously and is firmly connected with the housing. The metal tube is suitably connected with the housing by enlarging the end of the metal tube facing the housing and introducing the enlarged end of the tube into the cable lead-in opening which is wider at the housing inlet and fitted to the enlarged end, and by fastening it firmly within this widened opening by brazing or threading. The glass seal is advantageously located between a thin-walled inner tubing which covers the inner conductor in a waterproof manner and a thick-walled outer tubing which forms part of the outer conductor, the thick-walled outer tubing being disposed resistant to longitudinal pressure within the cable lead-in opening, for example, by securing it by means of a tubular nut or by abutment against a shoulder formed in the outer housing.

The foregoing and other objects and features of the invention will appear from the description of embodiments which will be rendered below with reference to the accompanying drawings. In these drawings, Fig. 1 shows an embodiment comprising a glass seal disposed between tubings forming respectively parts of the inner and outer cable conductors and a tubular nut for securing the outer tubing in engagement with a tubular extension of the junction box;

Fig. 2 indicates parts extending from the right of the structure of Fig. 1 (or any corresponding part of the structures shown in the remaining figures) illustrating layers of insulation wrapped about part of the tubular housing extension and the cable insulation;

Figure 1:
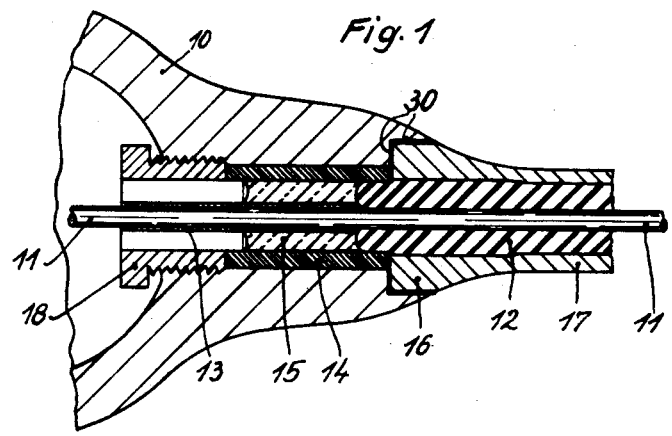

In Fig. 1, 10 is the cable lead-in end of a thick-walled pressure-resistant housing of a junction box containing repeaters or the like; 11 is the inner cable conductor insulated by a thermoplastic material 12, for instance polyethylene. The seal comprises a thin-walled inner tubing 13, a short, thick-walled outer tubing 14 and a glass seal 15 provided between the two tubing members. Into the lead-in opening, which is widened at the housing inlet, the enlarged end 16 of a tube 17 made of metal such as copper or the like, is inserted in a mechanically strong and watertight manner, by brazing as indicated at 30. For the introduction of the cable, the conductor 11, with its insulation 12 partially stripped off, is introduced sufficiently far into the housing through the tube 17 in engagement with the insulation 12 that the necessary conductor connections can be effected with the insulation 12 closely abutting the glass seal 15. Thereupon the inner tube 13, the inner surface of which is preferably tinned, is soldered over the longest possible length to the conductor 11, the surface of which is preferably likewise tinned. The nut 18 is thereupon firmly tightened against the inner end of the outer tube 14. In order to avoid ingress of water along the insulation 12, the tube 17 is in generally well known and well understood manner rolled or drawn firmly against the insulation at intervals or continuously. The successive steps in forming the sealed connection will be apparent from the following more detailed explanations.

In Fig. 1 as well as in the remaining Figs. 2 to 8, the thermoplastic cable insulation 12 must be carried close to the glass seal 15. This is accomplished by heating the end of the cable insulation 12 and by applying slight pressure. The inner conductor 11 as well as the insulation 12 are at this stage of the operation movable with respect to the metal tubing 17 and air trapped between the insulation and the tubing can accordingly escape when the end of the insulation is pressed against the glass seal. The inner diameter of the metallic tubing 17 must, of course, be initially larger than the outer diameter of the insulation 12 so as to permit introduction of the insulated conductor thereinto or rather to say, to permit pushing the metallic tubing over the insulation. The metal tube 17 serving as the outer conductor, is in well known manner rolled onto the cable insulation so as to assume the desired inner diameter, after the inner tubing 13 is soldered to the inner conductor 11 and after the end of the insulation 12 has been pressed against the glass seal.

The operations involved in introducing an electric cable through a metal tubing and joining it with a junction box or the like, including the rolling of the metal tube onto the cable or stripping it therefrom, are generally well known in the art and need not be detailed herein. The tubing 17 is shown in Fig. 1 in its position after having been rolled onto the cable. The enlarged end 16 of the metal tubing retains its desired diameter. The slight difference between the inner diameters of the enlarged end 16 and of the remaining portion of the tubing is apparent from the drawings.

It must also be considered in connection with the escape of air incident to joining the inner end of the insulation 12 with the sealing parts including the glass seal 15, that the inner diameter of the inner tubing 13 exceeds the outer diameter of the inner conductor 11. Accordingly, air can escape when the insulation 12 is pressed against the glass seal providing a tight seal.

Figure 2:
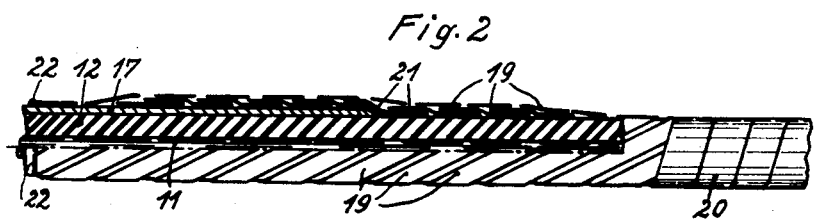

Fig. 2, which substantially represents a continuation of the right hand end of Fig. 1, shows the introduction of the cable into the tubing 17. Over the cable insulation there are disposed the outer conductor 19 made of copper bands, which are stranded with gaps, and the overlapped copper band winding 20. For the introduction of the insulated cable conductor into the tubing 17 the copper band 20 and the outer-conductor bands 19 are removed over a sufficient length. After the tube 17 has been firmly rolled onto the insulation 12, insulating tapes 21 which are as non-hydroscopic as possible and preferably made of the same material as the cable insulation, for instance polyethylene, are firmly wound in several plies about the exposed cable insulation and the tube 17 in order further to seal the tube 17 relative to the cable insulation. The outer-conductor bands 19 are then placed over the insulating tape 21 and soldered to the tube 17 at the places 22. The copper band 20 can, as indicated, be cut off and connected by soldering with the outer-conductor bands, but it is advisable to extend the band covering up to approximately the solder points 22 and to fasten them there also by soldering. The metal sheathing wires are then placed in known manner over the entire assembly and spliced in the customary manner, in which connection it is advisable to hook together every two wires coming from both sides over the box so that there is obtained a change in the direction of twist of the sheathing wires. In this way, as known, there is avoided any twisting of the box, which has a larger diameter than the cable, should tensile stresses occur upon the laying of the cable.

Figure 3:
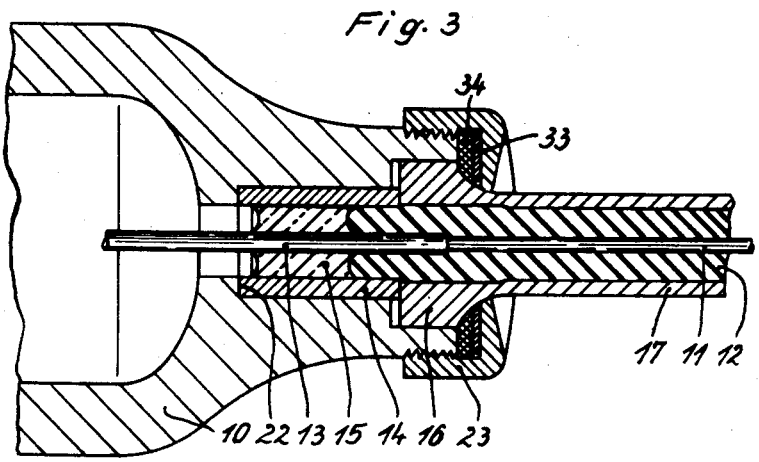
Fig. 3 shows an embodiment similar to Fig. 1 comprising a member in threaded engagement with the extension of the junction box for securing the outer tubing within a recess formed therein.

In the embodiment according to Fig. 3, the cable lead-in opening of the extension 10 of the junction box is provided with a shoulder 22 for abutment with the inner end of the thick-walled outer tubing 14 which is fused to the glass seal 15. The metal tube 17 is prior to the installation of the cable lead-in pushed over the insulation 12. The entire seal comprising the thick-walled outer tubing 14, the glass seal 15 and the inner tubing 13 is thereupon inserted into the cable lead-in opening and the inner conductor 11 is at the same time inserted into the inner tubing 13 until the outer tubing 14 abuts the shoulder 22. The metallic tube 17 is thereafter moved until its inner end abuts the outer end of the thick-walled outer tubing 14. Gaskets 33 and 34 are then placed in position and the cap nut 23 is tightened to secure the parts in firm traction-proof position. The insulation 12, the inner end of which is heated, as described before, is pressed inwardly, against the glass seal 15, air escaping rearwardly through the tube 17 and inwardly through the tube 13 (into the junction box). The metal tube 17 is thereafter in well known manner rolled onto the cable insulation 12 and sealed to the structure at the inner end thereof as explained in connection with Fig. 2.

Figure 4:
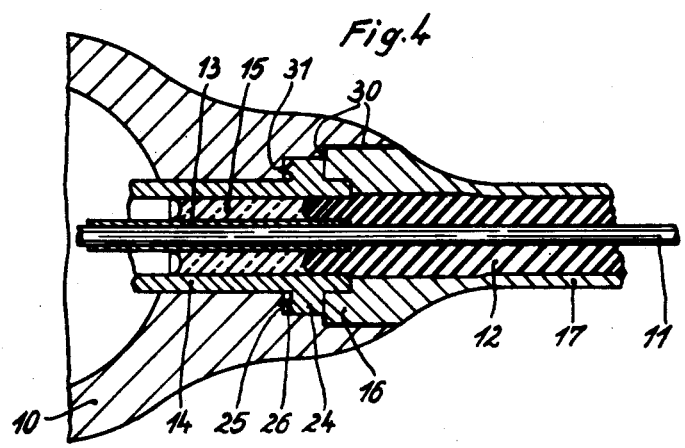
Fig. 4 illustrates an embodiment similar to Fig. 1 comprising an outer tubing having a collar provided with an annular axially directed projection fixedly secured to a stepped wall portion of the extension of the junction box.

In Fig. 4 there is shown an embodiment in which the thick-walled outer tubing 14 is provided with a collar 24 which is welded to the shoulder surface 25 of the cable lead-in opening, as indicated at 31, to produce a seal. For this purpose, there is provided on the collar 24 the annular tapered projection 26 which is in known manner welded to the shoulder 25. Numeral 30 indicates the brazing between the parts 16 and 24.

Figure 6:
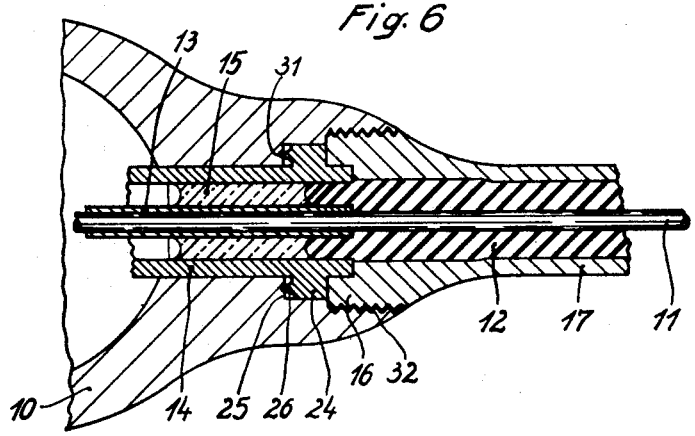
Fig. 6 illustrates an embodiment similar to the one shown in Fig. 4 but employing a threaded connection between the outer tubing and the junction box.
Figure 7:
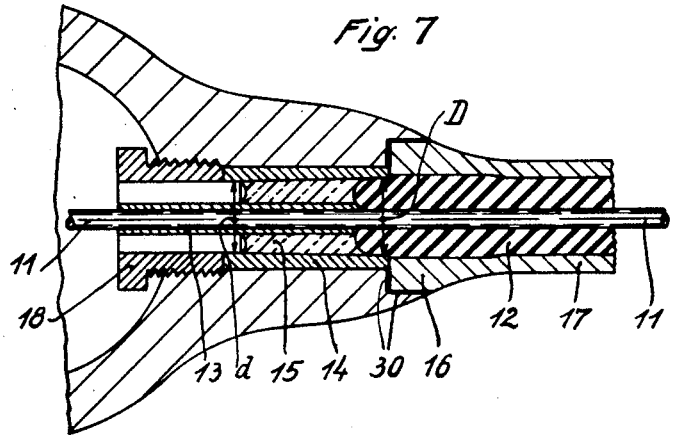
Fig. 7 is similar to Fig. 1 except for the use of an outer tubing having a slightly conical bore formed therein.

The invention, which essentially provides for leading the cable insulation in a sealing manner along the glass seal provided within the cable lead-in opening is not limited to the embodiments indicated. For instance, as shown in Fig. 6, the metal tube 17 may be threaded into the housing wall and the necessary tightness may be obtained by soldering together the threads. The glass seal may be made slightly conical so that its larger diameter faces the cable, as shown in Fig. 7. In such case, the bore of the thick-walled outer tube 14 is made slightly conical. The forcing out of the glass seal in case of very high water pressures acting from the outside in this way is avoided. The cable insulation may be pressed under such high pressure against the glass seal that the insulation bulges out at the end of the housing or at the end of the metal tube, and the bulge may then be used to assist in producing the seal. An example of the last-noted embodiment is shown in Fig. 5.

Figure 5:
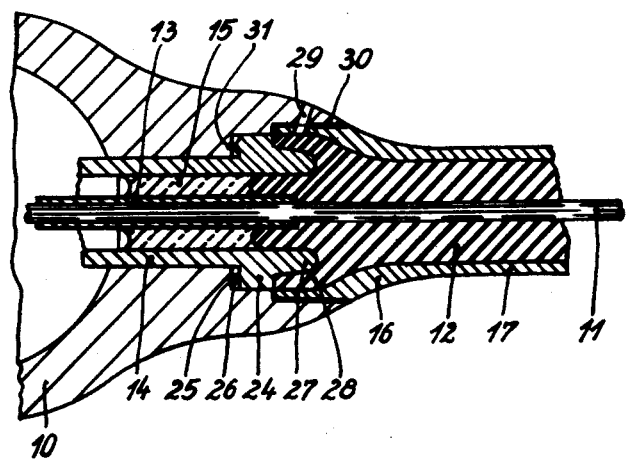
Fig. 5 shows an embodiment in which the cable insulation forms a bell-shaped seal about the tubings which embrace the glass seal.

The embodiment shown in Fig. 5 is generally similar to the one illustrated in Fig. 4 except that the end of the tubing 14 facing the cable insulation 12 is provided with an endwise rounded extension 27. The enlarged end 16 of the tube 17 is interiorly hollowed out providing an annular space between the extension 27 and the inner end of the enlargement 16. When the cable insulation 12 is in sufficiently heated and plastic condition pressed in longitudinal direction against the end of the glass seal 15, it will flow around the extension 27 and fill the annular space as indicated at 28. Breather holes 29 are provided in the casing wall 10 and in the tube 16 to permit air to escape incident to pressing the insulating material into place; several such holes may be provided and uniformly distributed about the circumference of the corresponding parts. A seamless bell-shaped seal is in this manner provided.

It would be possible of course to fill the annular space containing the insulating sealing portion 28 separately with insulating material which would be joined with the cable insulation 12 upon pressing the latter in plastic condition against the glass seal 15. If polyethylene is used in such case for the cable insulation 12, the same material would be used for the separate annular sealing portion to be provided at 28. The breather openings 29 are after completion of the seal closed, for example, by a suitable solder.

The embodiment shown in Fig. 6 is similar to the one illustrated in Fig. 4, with the only difference that the enlarged end 16 of the metal tubing 17 is provided with a thread for threaded engagement with an inner thread in the extension 10 of the junction box. The corresponding threads may be provided with solder which becomes effective to form a sealed joint upon applying heat either during the joining of the parts or thereafter. The solder seal is indicated at 32.

In Fig. 7, the inner diameter of the bore in the outer tubing 14, facing the cable, exceeds the diameter at the opposite end facing the inside of the junction box, thus forming a slightly conical bore. The corresponding structure provides for greater strength of the glass seal so as to resist axial pressure exerted from the cable insulation.

Changes may be made within the scope and spirit of the appended claims.

I claim:

1. In a waterproof pressure resistant sealing device for connecting to a junction box a coaxial submarine cable provided with thermoplastic insulation for the inner conductor thereof, said junction box having a lead-in extension forming an opening having a stepped interior wall forming a recess, a seal comprising a relatively thin-walled inner tubular member surrounding in watertight sealing engagement the inner conductor of said cable for a portion thereof which projects through said opening, a relatively thick-walled outer tubular member disposed in said opening, an annular glass seal disposed between and fused to said inner and outer tubular members, said thermoplastic cable insulation extending to and into tight sealing engagement with the end of said glass seal which faces away from the inside of said junction box, an elongated interiorly substantially cylindrical metallic tubing directly surrounding said cable insulation in intimate engagement therewith, said metallic tubing having an enlargement at the end thereof which faces the lead-in extension of said junction box, said enlargement being disposed within said recess formed by the stepped interior wall of said lead-in extension and being in engagement with said outer relatively thick-walled tubular member, and means for firmly connecting said enlargement in watertight sealing engagement within said recess.

2. A structure according to claim 1, comprising layers of non-hygroscopic bands of insulating material firmly wound about said metallic tubing and about part of said cable insulation to secure such tubing in sealing engagement therewith.

3. A structure according to claim 1, comprising means in threaded engagement with said lead-in extension inside of said junction box and engaging the corresponding inner end of said relatively thick-walled tubular member for securing the other end of such member in intimate engagement with the enlargement of said metallic tubing.

4. A structure according to claim 1, comprising means in threaded engagement with the outer end of said extension for pressing the inner end of said enlargement of said metallic tubing into firm and intimate engagement with the outwardly facing end of said relatively thick-walled tubular member and thereby securing the inner end of said tubular member in intimate engagement with an end wall of said stepped lead-in recess.

5. A structure according to claim 1, wherein said relatively thick-walled tubular member is provided with an annular collar formed thereon, said collar carrying a pointed annular axially directed projection for sealing engagement with a wall of said stepped recess.

6. A structure according to claim 1, comprising an outwardly directed extension projecting from said outer relatively thick-walled tubular member, said cable insulation embracing said extension in sealing engagement therewith.

7. A structure according to claim 6, wherein said extension is rounded at the end thereof.

8. A structure according to claim 6, wherein the enlargement of said metallic tubing overlies said extension projecting from said relatively thick-walled tubular member and forming an annular space therewith which is filled with said cable insulation.

References Cited in the file of this patent

UNITED STATES PATENTS

| 2,158,492 | Bishop | May 16, 1939 |
| 2,676,197 | Read et al. | Apr. 20, 1954 |
| 2,718,543 | Lidderdale | Sept. 20, 1955 |

FOREIGN PATENTS

| 1,097,249 | France | Feb. 16, 1955 |